United States Patent [19]

Plourde

[11] 4,105,342
[45] Aug. 8, 1978

[54] LIQUID DECANTING AND RECYCLING MACHINE

[76] Inventor: Aimé Plourde, 2e rang Centre, Trois-Pistoles, Canada

[21] Appl. No.: 725,042

[22] Filed: Sep. 20, 1976

[30] Foreign Application Priority Data

Sep. 26, 1975 [CA] Canada .................................. 236509

[51] Int. Cl.² .......................... A46B 15/00; B08B 3/00
[52] U.S. Cl. ...................................... 401/15; 134/111; 15/106
[58] Field of Search .................. 401/15; 134/109, 111, 134/85; 15/106; 259/95; 210/83, 513

[56] References Cited

U.S. PATENT DOCUMENTS

| 2,352,356 | 6/1944 | Albertson | 134/109 X |
| 2,624,463 | 1/1953 | Freese | 134/109 T |
| 2,675,012 | 4/1954 | Scales | 134/111 X |
| 3,707,404 | 12/1975 | Carlson et al. | 134/109 X |
| 3,890,988 | 6/1975 | Lee | 134/111 |

*Primary Examiner*—Stephen C. Pellegrino

[57] ABSTRACT

A machine adapted to produce efficient decanting and recycling of a liquid, such as an oil and grease solvent, and characterized by the combination therein of a laterally wandering upward flow and pumping of the liquid from close to the top surface of the latter. This liquid decanting and recycling machine includes a case, a barrel forming a reservoir in the case, a pan forming the top of the case, a drain connected to the pan and having an outlet tube centrally extending in the barrel and forming an outlet opening submerged in the latter adjacent the bottom thereof, a liquid circulation pump, an inlet for the pump submerged in the barrel operatively close to the top surface of the liquid in the latter, baffles positioned between the outlet opening and the pump inlet and arranged to produce and laterally wandering upward flow path, an outlet tube leading above the pan, and a brush connected to this outlet tube and having a set of softer and a set of stiffer bristles for selective soft or hard brushing of the parts being cleaned by the solvent.

9 Claims, 4 Drawing Figures

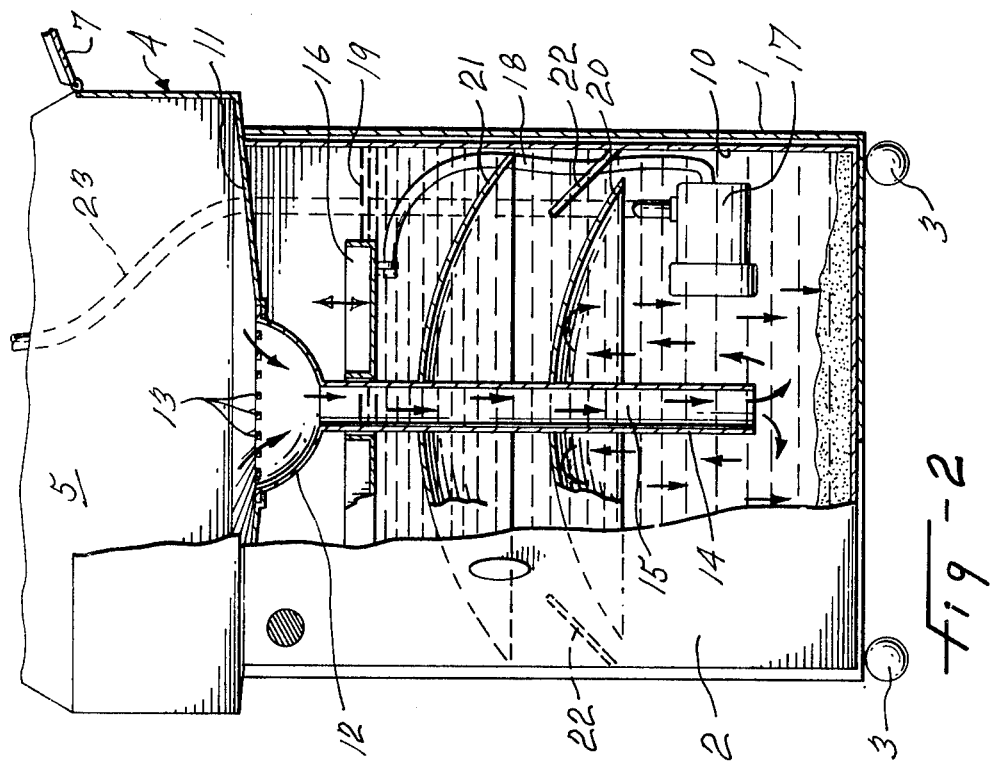
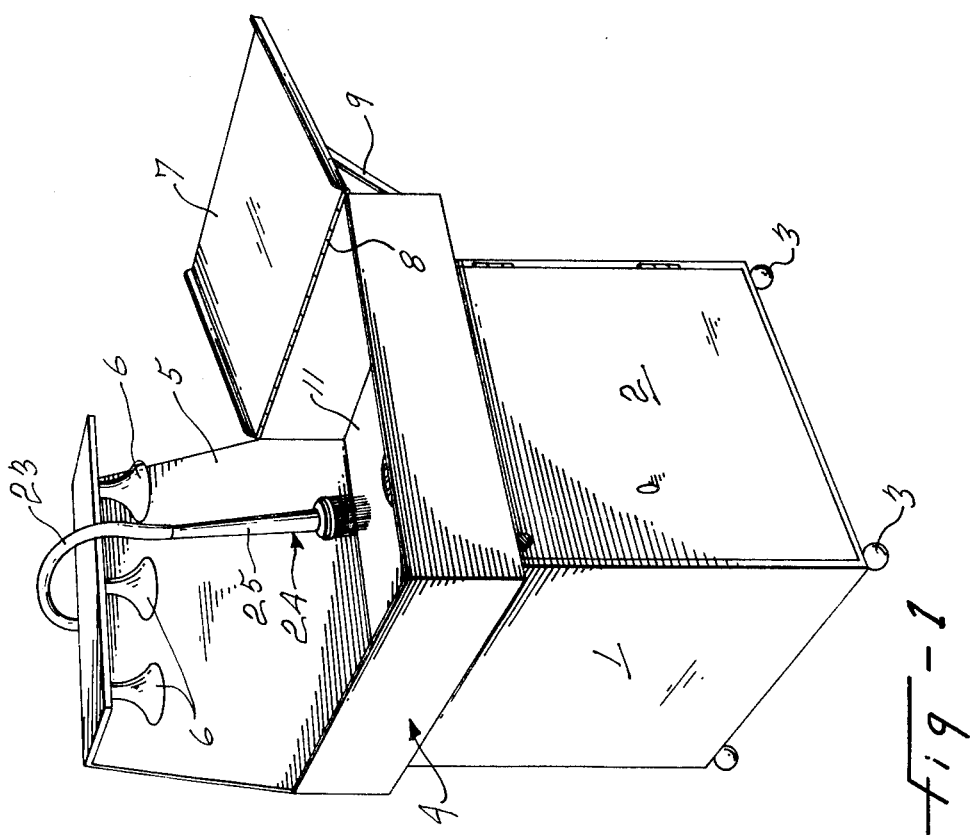

LIQUID DECANTING AND RECYCLING MACHINE

This invention relates to a machine for decanting and recycling a liquid and, in particular, to a machine of the type adapted to clean or wash mechanical parts like machine or vehicle parts in a maintenance shop or garage. The present invention also relates to a brush particularly suited for use in a machine of the above type.

In most mechanical maintenance shops and garages, the mechanical parts are cleaned in a grease and oil solvent, such as gasoline or varsol, using any readily available container without any filtering of the used solvent. In such cases, the solvent rapidly becomes so soiled with grease, oil and the like that it has soon to be replaced by a fresh supply. Some machines of the above type have anteriorly been proposed but the purifying process used in any of them does not appear very efficient and replacement of the solvent is still required relatively often. The cost, time and other inconveniences of such replacement prevent the acceptance of the anteriorly proposed machines.

It is a general object of the present invention to provide a liquid decanting and recycling machine which obviates the above-mentioned disadvantages.

It is another general object of the present invention to provide a machine of the above type which is satisfactorily efficient to decant and recycle a liquid, such as an oil and grease solvent.

It is a further general object of the present invention to provide a liquid decanting and recycling machine which is particularly adapted to be embodied in a machine to clean mechanical parts, but which is also suitable for other applications.

It is a more specific object of the present invention to provide a machine wherein there is produced a laterally wandering upward flow path in combination with pumping of the liquid from close to the top surface of the latter for efficient decanting and recycling.

It is still another object of the present invention to provide a machine of the above type with a brush particularly adapted to clean the mechanical parts.

It is another specific object of the present invention to provide a machine of the above type with baffles particularly adapted to assist and induce decanting and with a pump inlet which remains submerged a predetermined distance from the level of solvent to avoid recirculation of the floating on top of the solvent.

The above and other objects and advantages of the present invention will be better understood in the light of the following detailed description of a preferred embodiment thereof which is illustrated, by way of example, in the accompanying drawings, wherein:

FIG. 1 is a perspective view of a liquid decanting and recycling machine according to the present invention and, in particular, for cleaning mechanical parts;

FIG. 2 is a cross-sectional elevation view of the machine of FIG. 1;

Figure 4:
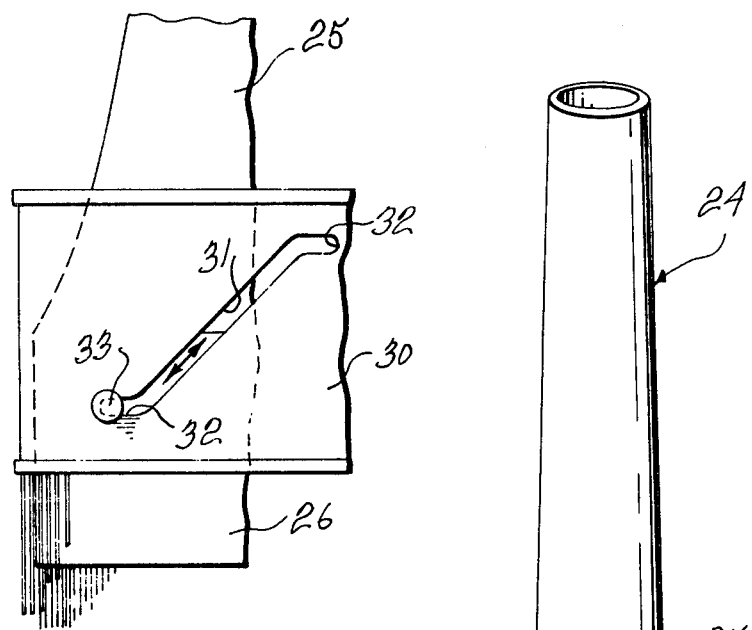
FIG. 4 is a detailed view of FIG. 3 particularly showing the slot locking feature of the brush.

The illustrated liquid decanting and recycling machine includes a case, or housing 1, having a front door 2 and carried on casters 3. The top of the case 1 widens to form a pan 4. The back panel 5 of the pan 4 projects higher than the remainder of the latter to form a support for lamps, such as the lamps 6. A drip panel 7 is pivotally connected to one side edge of the pan 4 by a piano type hinge 8 and by arms 9.

A barrel 10 is removably inserted in the case 1 and forms a cylindrical reservoir to hold a supply of solvent. A drain is connected to the bottom 11 of the pan 4 and includes a bowl-shaped funnel portion 12, a strainer 13 and a tubular portion 14 having a bottom opening 15 defining an outlet standing near the bottom of the barrel 10.

An annular shape float member 16 is slidably engaged around the tubular portion 14 of the drain to float on the liquid solvent in the barrel 10. A liquid circulation pump 17 is submerged in the barrel 10. A flexible inlet tube 18 is connected to the pump 17 and includes an open upper end forming the pump inlet and which is suspended under the float member 16 at a predetermined distance from the liquid level 19 in the barrel 10. It will be readily understood that the pump inlet defined by the flexible tube 18 is displaceable up and down with the float member 16 with the changes in the liquid level 19. Thus, the open upper end of the tube 18 is kept below the level of solvent to avoid recirculation of any oil floating on top of the solvent in the barrel.

A pair of dome-shaped baffles 20 and 21 are centrally secured to the tubular portion 14 in vertically spaced-apart relationship relative to each other between the outlet opening 15 and the open upper end of the tube 18. The periphery of the upper baffle 21 extends very close to the cylindrical internal face of the barrel 10 while the periphery of the lower baffle 20 is spaced relatively farther from the internal face of the barrel. The periphery of the upper baffle 21 and the internal face of barrel 10 establishes a communication between the portions of the barrel, or reservoir 10, immediately above and below baffle 21, which is at a different radial distance from outlet tube 14 than the radial distance of the communication of the lower baffle 20 between the portions of the barrel 10 immediately above and below said lower baffle 20, said latter communication being defined by the peripheral edge of the lower baffle 20 and an intermediate frusto-conical baffle 22 which has its outer peripheral edge secured against the cylindrical internal face and an inner edge outwardly spaced from the tubular portion 14 intermediate the two dome-shaped baffles 20 and 21 and such that this inner edge overlies the lower dome-shaped baffle 20. Thus, as will be explained later, these baffles form a laterally wandering upward flow path for the solvent from the opening 15 to the open upper end of the inlet tube 18.

A flexible outlet tube 23 is connected to the outlet of the pump 17 and is of sufficient length to reach above the pan 4. A cleaning brush 24 is connected to the outer end of the outlet tube 23.

The cleaning brush 24 includes a tubular body 25 widening outwardly into a cylindrical portion 26. A plug 27 closes the outer end of the cylindrical portion 26 and is formed with at least one solvent outlet aperture 28. A set of soft bristles 29 are fixed in the plug 27 and outwardly project therefrom away from the body 25. A sleeve 30 is slidable over the cylindrical body portion 26 and has at least one guide slot 31 formed therein. The latter is of sufficient length to allow the desired axial sliding of the sleeve relative to the body 25 and the bristles 29. The guide slot 31 further has laterally extending end portions 32 to cause axial locking of the sleeve 30 in either retracted or extended position. The cylindrical body portion 26 includes one guide pin 33 extending in each guide slot to guide the displacement of the sleeve 30 relative to the body 25. The laterally extending end portions 32 are provided to lock the sleeve 30 in either a retracted position or an extended position, as shown in full lines and dotted lines respectively in FIG. 3. The sleeve 30 is provided with a set of rigid bristles 34 surrounding the soft bristles 29.

Figure 3:
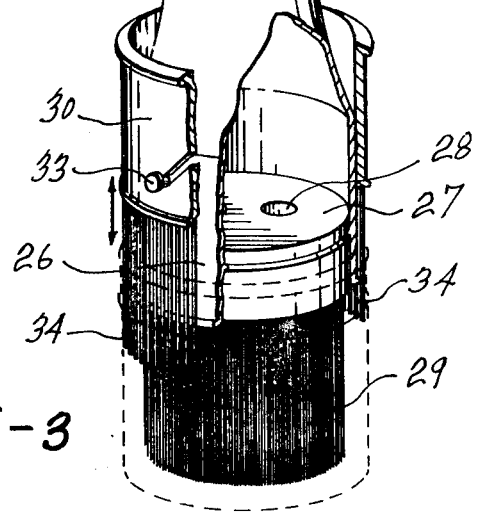
FIG. 3 is a side view, partly broken away, of a brush for the cleaning of machinery parts according to the present invention.

When the liquid circulation pump 17 is actuated, the solvent such as varsol, gasoline or the like, is pumped from under the liquid level 19 and outwardly through the brush by the solvent outlet aperture or apertures 28. The user of the machine uses the brush body 25 as a handle to brush and clean the mechanical parts he has to clean. The brushing may be done with either the soft bristles 29 or the rigid and, preferably, metallic bristles 34. The soft bristles 29 are selected by moving the sleeve 30 until the pin 33 engages into the outermost end portion 32, as shown in FIG. 3. The rigid or still bristles 34 are selected by sliding the sleeve 30 to its outermost position, such that the pin 33 engages in the innermost end portion 32.

The drip panel is preferably open, as shown in FIG. 1, during the cleaning operation to allow full access to the pan 4 and to rest the cleaned parts on the drip panel for drip drying of the latter. The soiled solvent flows down from the pan 4 in the drain tube 14 and out of the outlet 15 freely in the barrel 10 adjacent the bottom thereof. The solvent in the barrel flows relatively slowly upward to be deflected downwardly and outwardly by the bottom baffle 20, then upwardly and inwardly by the intermediate baffle 22 and, finally, again downwardly and outwardly by the top baffle 21. Thus, these baffles 20, 21, and 22 produce a laterally wandering upward flow path.

It must be noted that the baffles 20 and 21 by their dome shape induce a downward return of the solid particles entrained by the soiled solvent, thus assisting the clarification produced by the decanting action.

Various details of construction, such as the number of baffles and relative sizes, may be modified without departing from the spirit and scope of the invention as defined by the appended claims.

What I claim is:

1. A liquid decanting and recycling machine comprising a reservoir for holding a liquid, a pan positioned above the reservoir, a drain operatively associated to the pan and having an outlet tube extending substantially vertically centrally into the reservoir and forming an outlet opening at its lower end adapted to be submerged in the liquid adjacent the bottom of said reservoir, a liquid circulation pump, an inlet for said pump submerged in the reservoir operatively close to the top surface of the liquid in the latter, at least two superposed spaced baffles positioned in the reservoir intermediate said outlet opening and said pump inlet and surrounding said outlet tube, said superposed baffles making liquid communication between portions of the reservoir immediately above and below the respective baffles, the communication of one baffle being at a different radial distance from said outlet tube than the communication of the other baffle, said baffles producing laterally wandering upward flow of the liquid from the outlet opening to the pump inlet, and an outlet conduit connected to the outlet of the pump and extending outwardly of the reservoir to supply a liquid flow above the pan.

2. A liquid decanting and recycling machine as defined in claim 1, wherein each baffle has a dome shape with a downwardly outwardly inclined peripheral portion.

3. A liquid decanting and recycling machine comprising a reservoir, a pan positioned above the reservoir, a drain operatively associated to the pan and having an outlet tube extending substantially vertically centrally into the reservoir and forming an outlet opening at its lower end adjacent the bottom of said reservoir, a liquid circulation pump, an inlet for said pump adapted to be submerged in the liquid in said reservoir and operatively close to the top surface of the liquid in said reservoir, baffle means positioned in the reservoir intermediate said outlet opening and said pump inlet and producing laterally wandering upward flow of the liquid from the outlet opening to the pump inlet, an outlet conduit connected to the outlet of the pump and extending outwardly of the reservoir to supply a liquid flow above the pan, and wherein said baffle means includes a pair of baffles centrally secured to the outlet tube in spaced-apart overlying relationship and an intermediate baffle outwardly secured to the reservoir intermediate said pair of baffles and cooperatively forming with the latter, said laterally wandering upward flow.

4. A liquid decanting and recycling machine as defined in claim 3, wherein said baffles slope downwardly outwardly from the outlet tube of the drain.

5. A liquid decanting and recycling machine as defined in claim 4, wherein said reservoir includes a cylindrical and axially upstanding internal face, each baffle of said pair of baffles is domeshaped and includes a circular outer edge closely spaced internally of the cylindrical internal face, and said intermediate baffle is of frustoconical shape and includes an outer edge secured against said cylindrical internal face and an inner edge outwardly spaced from the outlet tube.

6. A liquid decanting and recycling machine as defined in claim 5, further including an annular-shaped float member floatable onto the liquid operatively contained in the reservoir, and engaged around said outlet tube for upward sliding along the latter in relation to the level of liquid in the reservoir, said pump inlet being connected to the float member and carried by the latter in predetermined submergence relative to the top surface of the liquid, a brush having a liquid passage therethrough, and said outlet conduit constituting an outlet hose connected to the brush in communication with the liquid passage thereof to eject a cleaning liquid from the latter.

7. A liquid decanting and recycling machine as defined in claim 6, further including a case, said reservoir constituting a barrel removably engaging in said case, and said pan forming the top of said case.

8. A liquid decanting and recycling machine as defined in claim 7, further including a drip panel fixed along one edge of the pan and slightly slopes downwardly toward the latter for drip drying the cleaned parts resting on the drip panel.

9. A liquid decanting and recycling machine as defined in claim 1 comprising a reservoir adapted to hold a liquid therein, a pan positioned above the reservoir, a drain operatively associated to the pan and having an outlet tube extending substantially vertically centrally to the reservoir and forming an outlet opening at its lower end adapted to be submerged into the liquid adjacent the bottom of said reservoir, a liquid circulating pump, an inlet for said pump submerged in the liquid of said reservoir operatively close to the top surface of said liquid, baffle means positioned in the reservoir intermediate said outlet opening and said pump inlet and producing laterally wandering upward flow of the liquid from the outlet opening to the pump inlet, an outlet conduit connected to the outlet of the pump and extending outwardly of the reservoir to supply a liquid flow above the pan, and further including an annular float member floatable onto the liquid operatively contained in the reservoir and engaged around said outlet tube for sliding along the latter in relation to the level of liquid in said reservoir and said pump inlet is connected to the float member and carried by the latter in predetermined submergence relative to the top surface of the liquid irrespective of the level of the latter in the reservoir.

* * * * *